United States Patent [19]

Willner et al.

[11] Patent Number: 5,038,893
[45] Date of Patent: Aug. 13, 1991

[54] LUBRICATION MONITORING SYSTEM

[75] Inventors: Clifford S. Willner, Utica; Christopher Willner, Rochester Hills, both of Mich.

[73] Assignee: Orsco, Inc., Madison Heights, Mich.

[21] Appl. No.: 411,678

[22] Filed: Sep. 25, 1989

[51] Int. Cl.$^5$ ............................................. F01M 1/18
[52] U.S. Cl. ..................... 184/7.4; 184/6.4; 184/39.1; 340/611
[58] Field of Search ................... 184/6.1, 6.4, 6.26, 184/7.4, 108, 55.1, 39.1; 73/168, 119 A; 340/606, 608, 611; 417/63, 46; 123/494, 496, 497, 499, 198 A

[56] References Cited

U.S. PATENT DOCUMENTS

| | | | |
|---|---|---|---|
| 3,007,414 | 11/1961 | Long et al. | 340/611 |
| 4,072,934 | 2/1978 | Hiller et al. | 340/608 |
| 4,292,841 | 10/1981 | Wesley | 73/119 A |
| 4,444,292 | 4/1984 | Brown et al. | 184/6.4 |
| 4,448,063 | 5/1984 | Mudge et al. | 73/115 |
| 4,613,059 | 9/1986 | Merkel | 222/52 |
| 4,668,948 | 5/1987 | Merkel | 340/606 |
| 4,712,736 | 12/1987 | Bray et al. | 239/11 |
| 4,735,286 | 4/1988 | Miki et al. | 184/6.4 |
| 4,800,367 | 1/1989 | Klintenstedt et al. | 184/6.4 |
| 4,840,148 | 6/1989 | Staerzl | 123/494 |
| 4,846,831 | 7/1989 | Skillin | 417/384 |
| 4,858,645 | 8/1989 | Reeves | 184/29 |
| 4,862,393 | 8/1989 | Reid et al. | 123/196 S |

*Primary Examiner*—James C. Yeung
*Assistant Examiner*—Alan B. Cariaso
*Attorney, Agent, or Firm*—Lloyd M. Forster

[57] ABSTRACT

Control system for measuring/detecting transient fluid flow in a positive displacement pump lubrication system using time-differential pressure measurements. A pressure-actuated transducer for a captive oil column in the injection circuit imparts a proportional voltage signal to an electronically differentiating high pass filter, rendering it independent of any base line steady-state component. The resultant signal is fed into a comparator used to discriminate rates of pressure change against a preset reference level, thereby sensing transient spike pressures covering a wide range of adjustable frequencies and pump displacement strokes to thereby confirm required lubrication flow. The same transducer voltage signal transmitted during a steady-state portion of the pump cycle between injections is monitored for high and low set points such as incident to downstream blockage or system leakage.

11 Claims, 3 Drawing Sheets

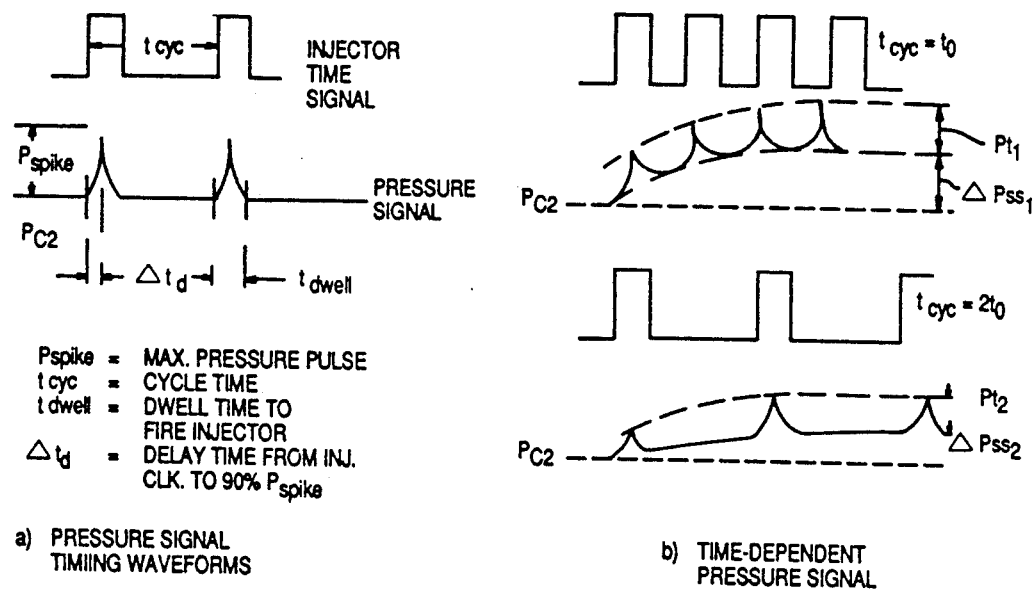
a) PRESSURE SIGNAL
TIMING WAVEFORMS
FIG.2A
b) TIME-DEPENDENT
PRESSURE SIGNAL
FIG.2B
FIG.3
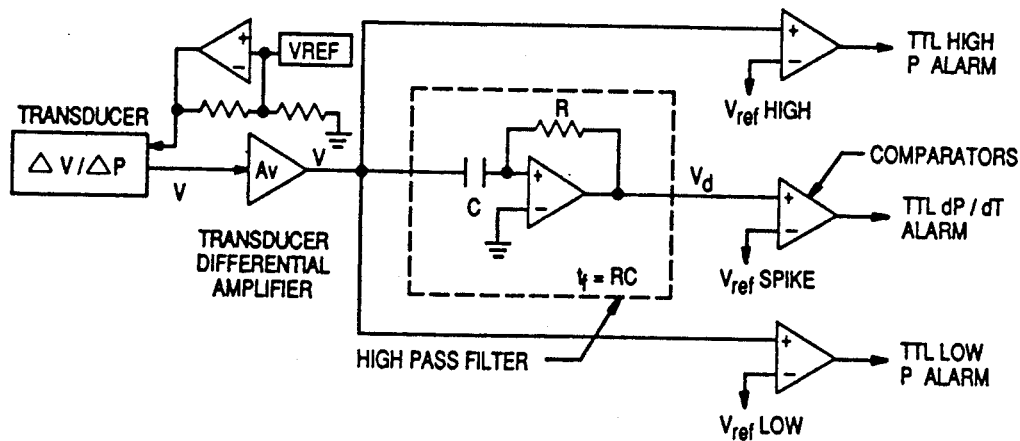

LUBRICATION MONITORING SYSTEM

BACKGROUND OF THE INVENTION

A lubrication system is disclosed in U.S. Pat. No. 4,785,913 for cyclically positively dispensing accurate liquid lubricant injections through a pressure resisting check valve into a pressurized oil filled delivery tube passage leading through a second pressure resisting check valve to a nozzle directed toward a lubrication target, and continuously supplying air under regulated pressure at the outlet of the second check valve to atomize, entrain and scour each injection of lubricant from surfaces at the check valve and nozzle, in order to deliver an accurate quantity of atomized lubricant mist during a substantial period of time following each positive injection of lubricant.

The present invention relates to a lubrication monitoring system which may have application to said lubricating system as a specific example, or other lubricating systems, where it is desired to detect pressure/flow defects. Potential malfunctions for which monitoring may be desired include, without limitation, the following:

1) a break in delivery line, or slight leak such as may occur overnight;
2) a blocked line arising from
   a) bent tube,
   b) dirt or sediment,
   c) metal chips,
   d) oil inclusions,
   e) crushed nozzle,
3) check valve malfunction;
4) tampering with air pressure regulator;
5) injector fails to fire;
   a) air failure
   b) piston breaks
6) electrical components fail;
7) oil reservoir empty.

Commercial applications include industrial injection lubrication systems; high speed spindle lubrication systems; chain lubrication; tenter clip lubrication; drilling and milling lubrication operations; air pneumatic processing dispensing of high viscosity oils, silicones and sludge compounds; dispensing of low viscosity substances, or any fluid system characterized by transient flow processes.

Prior state of the art includes various techniques for detecting fluid flow including:

1) Catalyst beads and/or hot wire anemometry which detect temperature/resistance changes in the bead or wire (inserted into fluid channel) in response to thermodynamic changes of the fluid/wire system due to its flow;
2) optical methods including laser-dopler velocimetry;
3) positive displacement proximity detectors which involve movement of metallic objects within the fluid and which either activate a switch contact or sense through proximity detectors (inductive/capacitive);
4) traditional means such as the venturi configuration and pitot tube which rely upon space-differential pressure measurements.

Limitations of prior systems to detect pressure/flow defects for the complete range of potential malfunctions without undue complexity and expense or need for readjustment to correspond with user adjustment of injection stroke or frequency has led to the need for and development of the present, relatively simple and versatile solution applicable to virtually all commercial systems employing cyclical positive injection.

BRIEF DESCRIPTION OF THE PRESENT INVENTION

The primary object is directed to monitor any "faults" in small displacement of fluids in a captive-pressure positive-displacement cyclically pulsed injector system such as disclosed in U.S. Pat. No. 4,785,913; however, the system also applies to noncaptive and/or reciprocating pump systems where small fluid displacements need to measured or detected. An implementation of system, which has been commercially designated LCM-20 Injection Lubrication Control System, is a self-contained industrial process controller which includes a cycle timer for lubrication injector unit control particularly adaptable to pulsed injection lubrication systems characteristic of captive column, positive displacement injection lubricators. The LCM-20 is able to monitor and detect transducer high and low limit violations as well as generate transducer "spike" rate signals (differential process signal detection). It provides real time monitoring of process parameters and direct readout of alarm point reference values. The cycle timer can be selected for timing cycles of 0.1 second to 999.9 seconds, with an accuracy of + or −0.05 seconds. Dwell time is usually factory preset and is adjustable from 0.1 second to 1.6 seconds. The alarm reference levels (set points) are entered via a multiturn adjustment potentiometer located on the unit.

The monitoring system of the present invention is specifically directed to fully qualify injection lubrication systems, such as disclosed in U.S. Pat. No. 4,785,913, for use in industrial automated manufacturing systems by detecting irregularities in both steady-state and injection pressure spikes which are characteristic of "faults" in required timed injections. Since the peak magnitude of normal pressure spikes, as well as the steady-state or static pressure captive in between injection pulses, may vary with normal adjustable frequency or quantity stroke of injection, the system not only detects spike pressure exceeding high and low set point limits, which if solely relied upon would have to be adjusted to correspond with adjustments in stroke or frequency, but also at the same time appropriately monitors the rate of change of spike pressure between high and low set point limits which are generically characteristic of injection pressure spikes over a broad range of normal injection strokes and frequencies, thereby providing detection for variations in spike rate which are incident only to any injection flow irregularities which are to be monitored, and verification for cyclical injection within the entire acceptable range.

The monitoring of spike pressure rate change is effected by a commercially available pressure responsive transducer providing an electrical voltage proportional to pressure. The rate of voltage change responsive to the rate of pressure change is detected by electronically differentiating the signal condition transducer output. The signal is imposed upon a high pass filter rendering it independent of any base line or steady-state component. The resultant signal is fed into a comparator circuit which is used to discriminate rates of pressure increase or decrease against a preset reference level. Accordingly, the technique of time differentiating the output of a pressure transducer has been applied in order to detect transient pressure rate changes in an injector pump captive column of oil, as a means of discerning the transient or dependent time flow rate in an hydraulic flow network. Only one pressure transducer of a nondifferential type is necessary for each lubricating oil delivery circuit and the method is relatively independent of the geometry of the fluid system.

BRIEF DESCRIPTION OF THE DRAWINGS

FIG. 2A is a schematic diagram of pressure signal timing wave forms;

FIG. 2B is a schematic diagram of time-dependent pressure signal;

FIG. 3 is a schematic diagram illustrating transducer signal conditioning and alarm generation circuitry;

DETAILED DESCRIPTION OF A PREFERRED EMBODIMENT

Figure 1:
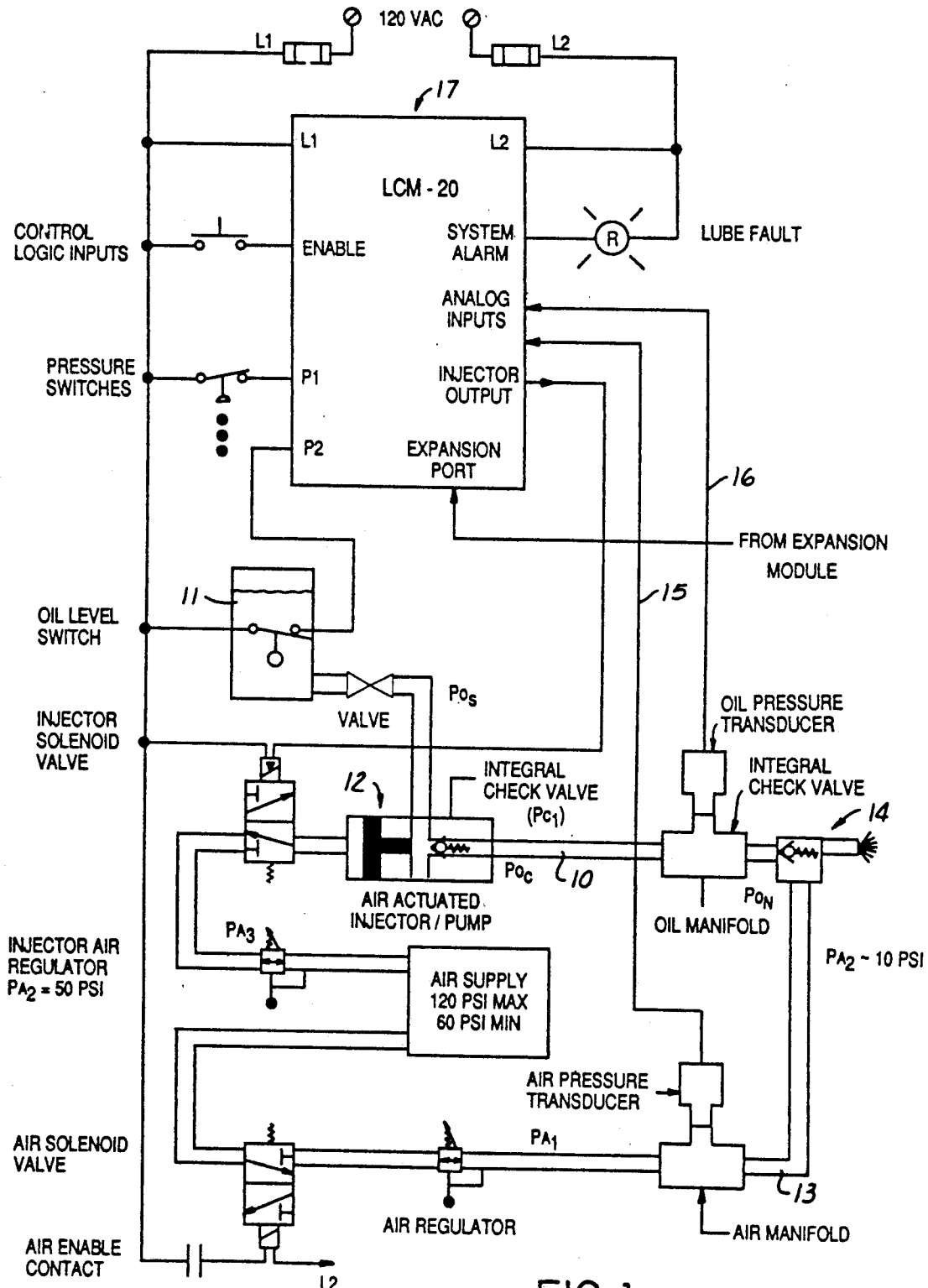
FIG. 1 is a schematic diagram of a typical fluid network employing the present monitoring system.

With reference to FIG. 1, schematically illustrating a typical application of the system to a typical industrial lubrication process, the system incorporates a captive column 10 of lubricant oil 11 which is pumped by a positive displacement injector 12. Air from line 13 is used to disburse the oil out of the nozzle of assembly 14. The air is low in velocity and employed for momentum transfer to the oil not as a shearing process. Two pressure transducers are employed for each lubrication point—an AIR PRESSURE TRANSDUCER for air line 13 and an OIL PRESSURE TRANSDUCER for captive column 10 of lubricant oil. Transducer output signals are respectively fed by line 15, carrying a voltage proportional to air pressure in line 13 and by line 16, carrying a voltage proportional to oil pressure in captive column 10, into a control module 17 designated "LCM-20", where the signals are processed as hereinafter described. For the air pressure signal, only a high and low limit will be monitored. The OIL PRESSURE TRANSDUCER is incorporated in the fluid network between the two check valves designated as INTEGRAL CHECK VALVE (Pc1), and INTEGRAL CHECK VALVE (Pc2), and thus measures the captive oil pressure in column 10. Pressure spike detection is derived from the oil pressure signal in order to verify actual delivery of lubricant.

Figure 4:
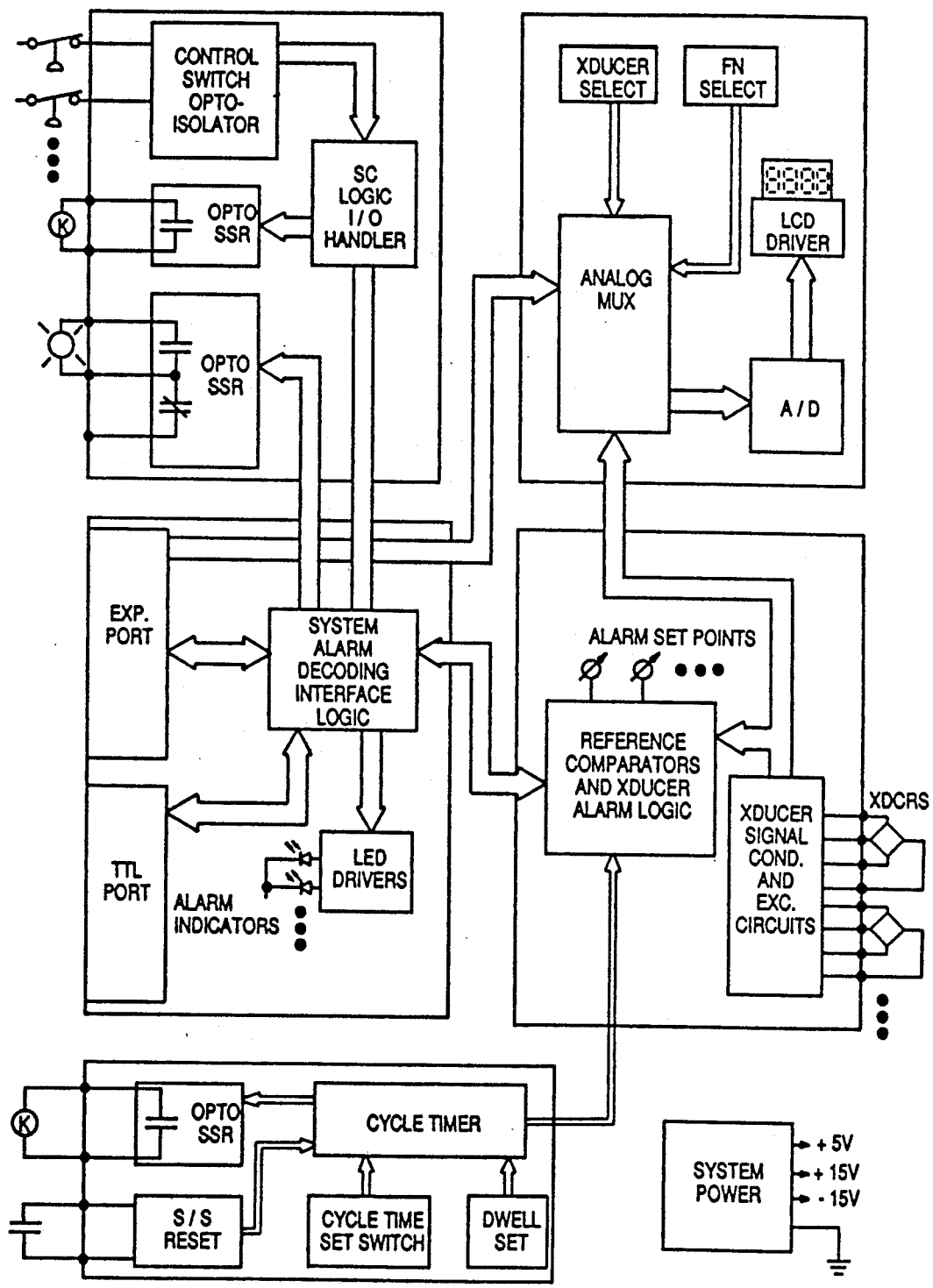
FIG. 4 is a schematic LCM-20 System Block Diagram.

The injector firing is controlled directly by CYCLE TIMER circuitry within the control module LCM-20 as indicated in FIG. 4. The injector is a positive displacement pump air actuated with a typical INJECTOR AIR REGULATOR pressure of 50 PSI, and a 20:1 piston/piston head ratio producing a maximum achievable pressure head, with a dead-ended gauge, of 1000 PSI. The AIR ACTUATED INJECTOR/PUMP, e.g., Master Pneumatic 456-3PA, delivers a precise amount of lubricant, adjustable from 10 ml to 40 ml, by forcing INTEGRAL CHECK VALVE (Pc1) (cracking pressure Pc1 typically=100 PSI) open for the duration of the injector stroke. INTEGRAL CHECK VALVE (Pc2) (cracking pressure Pc2 typically=90 PSI), is contained within nozzle cavity 14 which opens almost instantaneously after the introduction of fluid into captive column 10. The rate at which the injector is cycled by clock signal within the CYCLE TIMER control module thus determines the total volume of oil delivered to the nozzle cavity per unit time and subsequently the rate of lubricant delivered to the process part.

With reference to FIG. 2, the captive oil column develops a characteristic pressure which is comprised of a static (or steady-state) component, Pss, and a transient component, Pt, which is superimposed on the pressure waveform during the injector pulse. The right side of FIG. 2 illustrates waveforms having a higher transient spike, Pt1, and higher steady-state, Pss1 incident to higher injection frequency than Pt2 and Pss2 for lower time frequency. A similar higher transient spike and steady-state will result from an adjustable higher volume stroke of the injector piston so that the resultant pressure waveform reflects the combination of stroke and frequency.

Volume flow occurs only during the injector pulse indicated by the DWELL TIME TO FIRE INJECTOR, In such time the MAX. PRESSURE PULSE "P spike" is generated and dissipates due to delivery (FIG. 1) through INTEGRAL CHECK VALVE (Pc2). Injector CYCLE TIME "t cyc" establishes the frequency of the injection and, as noted above, it has been observed that the steady-state pressure increases with increased cycle rates as well as the MAX. PRESSURE PULSE "P spike". This can be the result of storage effects within the captive oil column which, coupled with the flow losses, results in an effective integration of the steady-state pressure. Therefore, the system emulates a "mechanical low pass filter" with an effective time constant during which the time-rate of change in head pressure completely stabilizes. For a typical lubricant system pumping standard 30 weight oil, such time constant may equal two minutes.

Pressure variations in the oil column 10 are further complicated by the effects of cavitation, compressibility of the process fluid, and the nozzle back pressure induced by the air during oil flow. Variation in steady-state pressure is overcome by utilizing the spike-detect feature of the present system which enables a 100% positive detection of fluid delivery to the nozzle.

Utilization of pressure transducers, along with LCM-20 monitoring allows the end user to detect blockages in the system (through high pressure detect) leaks, or breakage of fluid lines (through low pressure detect) and transient flow to the nozzle (through the spike detect feature). High and low pressure detection is limited in the CYCLE TIMER to that portion of the CYCLE TIME, t cyc, between DWELL TIME to FIRE INJECTOR, t dwell, while the spike detect feature is limited to each t dwell period. This provides for a much more reliable and fault-free lubrication process than has been possible with other systems.

Pressure transducers (of the F.W. Bridge configuration utilizing either silicon micro-electronic sensors or piezo electric crystals) are employed to measure the pressure of the air and oil lines. Commercially available Series 300, Transamerica - Delaval, Barksdale Div. pressure transducers have been employed and are satisfactory for the purpose. Electric signals which are sent to the control module, LCM-20, are processed to generate "fault" conditions based upon these signals.

With reference to FIG. 3, illustrating schematically the processing circuits to accommodate the transducers, electronic differentiating of the signal condition transducer output is accomplished by imposition upon a HIGH PASS FILTER, rendering it independent of any base line or steady state component. The resultant signal is fed into a comparator circuit used to discriminate rates of pressure increase or decrease against a preset reference level. A commercial comparator which has been employed in such circuit is produced by National Semiconductor Corporation under the designation LM339 which is combined with Texas Instruments dual D-type positive edge triggered transparent latch "flip-flops" designated 74LS74 which signal high and low alarms detected by the comparators.

The OIL PRESSURE TRANSDUCER produces a voltage $\Delta V$ directly proportional to pressure $\Delta P$ in oil column 10 which is amplified by TRANSDUCER DIFFERENTIAL AMPLIFIER to provide, for example, 15 for 300 PSI. The TTL HIGH P ALARM, TTL 74LS74, is employed with comparator LM339 to monitor a high set point, such as 10 V/200 PSI, while the corresponding TTL LOW P ALARM monitors a low set point, such as 5 V/100 PSI, each limited to the steady-state time between injections. Such high and low alarms will indicate respectively, faults such as downstream blockage interfering with nozzle delivery from captive column 10, but will not detect loss of the injector signal or a malfunction of subsequent fluid delivery.

THE HIGH PASS FILTER circuit, timed to operate only during the pressure spike DWELL TIME TO FIRE INJECTOR, t dwell, detects rate of change of pressure, independent of steady-state base line pressure, rather than a high or low fixed set point, and therefore can verify effective injector pumping and fluid delivery adjustments. By electronically differentiating the signal conditioning transducer output, imposed upon the HIGH PASS FILTER shown in FIG. 3, and feeding the resultant signal into a COMPARATOR used to discriminate rates of pressure change, $\Delta P/\Delta t$ against a preset reference level, any typical spike pressure rate of change can be readily verified at the comparator network.

Accordingly, the system employs the technique of time-differentiating the output of a single nondifferential pressure transducer to detect transient pressure changes in an injector-pumped captive column of oil, thereby discerning the transient or time dependent flow rate.

In a typical application of the present invention, within the LCM-20, are the excitation circuits, signal conditioning circuits, and comparator-logic/signal conditioning circuits to accommodate these transducers. Also, within the LCM-20 are the reference level settings, which determine lubrication system fault conditions, as well as an analog-to-digital conversion circuit which can display the reference levels and actual pressure readings.

Such LCM-20 Injection Lubrication Control System, in a typical installation comprise primary subsystems as schematically illustrated in the block diagram of FIG. 4. These include:

1) System Alarm Decoding and Interface Logic
2) 110 VAC Input/Output Signal Handler
3) Transducer Signal Processing Circuitry
4) Analog Signal Multiplexer and A/D Converter
5) Injector Cycle Timer 1) System Alarm Decoding and Interface Logic This subsystem decodes and multiplexes the digital alarm signals from the various systems in the LCM-20 and communicates these signals with the Display Drivers, AC logic Outputs, TTL Interface Port and Expansion Port. It also comprises the LED Alarm Indicator Lamps and driver circuitry. The Expansion Port accommodates 15 volt and TTL level (5 volt) digital signals which communicate status information between the Main Unit and the LCM-20E Expansion Units. In addition, the Cycle Timer signal and multiplexed analog signals (from the Expansion Units) are available at this interface. The TTL Interface is used to receive a polled address from an external controller module and read out the multiplexed alarm status signal.

2) 110 VAC Input/Output Signal Handler

This circuitry handles communication with a 110 VAC Ladder Logic which is usually employed in standard process control, robotic or factory automation applications. Control switches and relay contacts can be used to generate alarm signals which are subsequently multiplexed into the system alarm logic. These inputs comprise opto-isolator circuits with high noise immunity to industrial environments where motors, power lines, arcing equipment, lightning and other sources of interference can distort the internal low-level signals of a process controller. The outputs also incorporate optically-isolated SSRS (solid-state relays) and are used to generate 110 VAC alarm signals based upon the system status.

3) Transducer Signal Conditioning and Alarm Circuits

The LCM-20 accommodates transducers of the balanced impedance 4-wire configuration (Wheatstone-bridge). These include most types of pressure and torque transducers, load cells, strain gauges, accelerometers, Hall effect sensors and 4-wire temperature sensors. In addition, sensors of the 2-wire configuration, RTDs, thermocouples, thermistors (NPTs and RPTs), photoemissive, photoconductive and semiconductor diode and transistor sensors can be utilized by the appropriate calibration and wiring of the device. The unit provides a precision 10.00 volt excitation (this can be changed internally, for example to 5 volt excitation depending upon the type of transducer). The input amplifiers comprise a high input-impedance instrumentation amplifier configuration with high common-mode rejection ratio and tunable gain and offset adjustments.

The output signals are fed into the Reference Comparators whose reference values are preset by the multiturn Alarm Set Point Potentiometers. These signals represent the High, Low and Spike Alarm conditions associated with each Transducer. The resultant digital signal is then latched time-correlated with the Cycle Timer/Injector Signal, and sent to the Alarm Decoding Logic.

4) Analog Signal Multiplexer/Digital Converter A/D)

This circuitry is responsible for routing of the analog signals from the Transducer Signal Conditioning Circuits to the A/D (Analog-to-Digital) Converter and producing the digit-multiplexed BCD signals which are sent to the LCD display. These analog signals include the "real-time" Transducer readings, the analog reference levels (Alarm Set-Points) and the corresponding analog signals from the Expansion Units. The A/D Converter uses the Dual-Slope Integrating convention and refreshes about 3 times a second. With the Dual-Slope Integrator, the input voltage is time-integrated (in time T1) and compared against a time-integrated reference, Vref (in time T2).

The result is recalibrated to read out in units of the process variable (for example PSI) on the LCD display by the display driver circuitry. The parameter selection is determined by the action of the Function Select and XDCR Select Binary Switches upon the analog multiplexer circuit.

5) Injector Cycle Timer

The Cycle Timer generates a 10 Hz to 0.001 Hz output which is set via the Cycle Time Set Switches. A 110 VAC output control signal (to fire the Injector or other electric, pneumatic, hydraulic control components) is provided through an optically isolated SSR as shown. This signal is also used to time-correlate the transparent latches associated with the Transducer generated alarm signals. Dwell Time is internally settable from 0.1 sec. to 1.6 sec. The Enable input starts and stops the Cycle Timer and resets the timing cycle upon activation by a 110 VAC control signal. The LCM-20 has a "first-fire" option which resets the cycle timer in the event that it is disabled and subsequently re-enabled. Timing can be displayed on the integral LCD display via the FUNCTION Select switch.

While the foregoing provides an example of how any "fault" detected by monitoring rate of spike pressure change as well as high and low steady-state pressure may be employed in a complete expandable monitoring and control system, the present invention is primarily directed to the development of a dependable "fault" signal per se which verifies normal pressure variations, such as incident to injection frequency and stroke adjustments, while detecting abnormal pressure irregularities with a discriminating signal which may be used to produce any desired control function.

We claim:

1. Lubrication fluid flow monitoring system comprising positive displacement cyclical pump means discharging into captive pressure fluid passage having pressure resistant delivery outlet, and transient fluid passage rate of pressure change detection means for confirmational monitoring of operational transient fluid flow.

2. Monitoring system of claim 1 including fluid passage pressure responsive transducer means.

3. Monitoring system of claim 2 including transducer output responsive electronic time-differentiating means.

4. Monitoring system of claim 2 including transducer output responsive electronic time-differentiating high pass filter means.

5. Monitoring system of claim 4 including high pass filter means independent of base steady-state pressure.

6. Monitoring system of claim 5 including high base steady-state pressure limit detect means independent of said electronic time-differentiating means.

7. Monitoring system of claim 6 including low base steady-state pressure limit detect means independent of said electronic time-differentiating means.

8. Monitoring system of claim 7 including time allocated cycle means for limiting said high and low pressure limit detect means to a portion of the pump cycle between cyclical positive displacements.

9. Monitoring systems of claim 8 including set point comparators for each of said electronic time-differentiating and high and low pressure circuit means.

10. Monitoring system of claim 3 including only one pressure transistor for each oil delivery outlet.

11. Monitoring system of claim 3 including only one pressure transducer of a non-differential type for each delivery outlet.

* * * * *